Sept. 29, 1959 V. J. LUNDELL 2,906,085
HAY CHOPPER
Filed Dec. 2, 1954 3 Sheets-Sheet 1

INVENTOR.
Vernon J. Lundell
BY
Sam J. Slotsky
ATTORNEY

Sept. 29, 1959　　　　V. J. LUNDELL　　　　2,906,085
HAY CHOPPER
Filed Dec. 2, 1954　　　　　　　　　　　　　　3 Sheets-Sheet 2
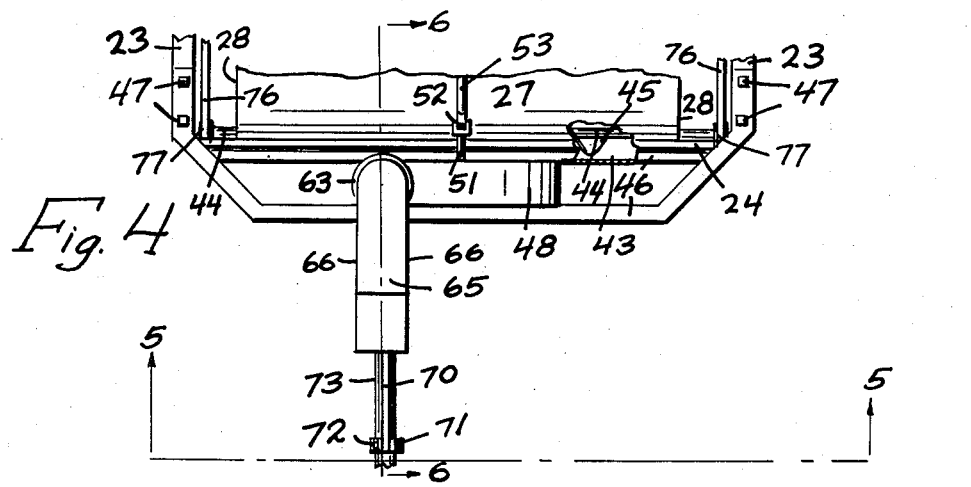
Fig. 4
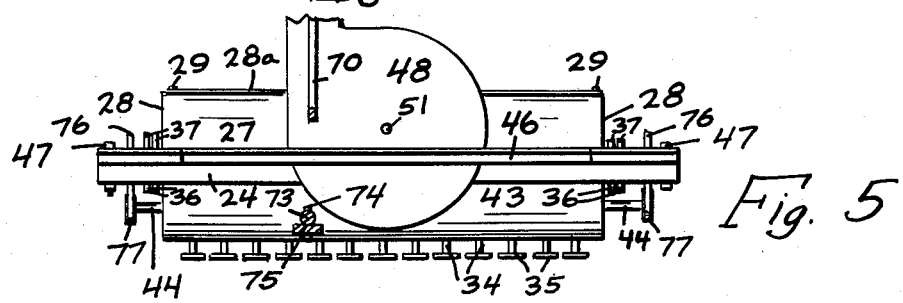
Fig. 5
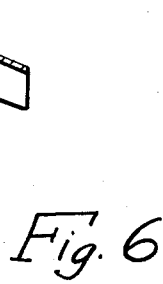
Fig. 6
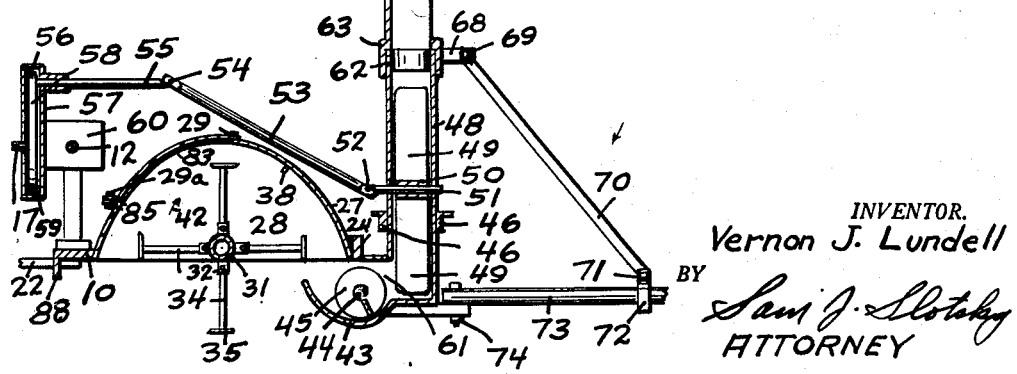
INVENTOR.
Vernon J. Lundell
BY
Sam J. Slotsky
ATTORNEY INVENTOR.
Vernon J. Lundell 329; United States Patent Office
2,906,085
Patented Sept. 29, 1959

2,906,085
HAY CHOPPER
Vernon J. Lundell, Cherokee, Iowa
Application December 2, 1954, Serial No. 472,654
1 Claim. (Cl. 56—505)

My invention relates to a convertible hay chopper.

An object of my invention is to provide a device which will gather hay from the field, the same device chopping the hay for the necessary feed or other purposes.

A further object of my invention is to provide such a device in a relatively efficient and simple construction, and to provide means wherein the hay chopper can be converted from one type to another, one type being for chopping the hay and without conveying the same away from the chopper; a further type being an arrangement in which the chopped hay is conveyed externally of the chopper and blown into a wagon or other similar device; and a still further type being that wherein the gathered and chopped hay is blown directly through the top of the unit into an external receiving device, the unit being so made as to accommodate all of the three types mentioned as desired.

A further object of my invention is to provide in combination with the blower and conveyor arrangement, means whereby the blower spout arrangement will rotate corresponding to the turning of a wagon drawn by the unit.

Figure 1:
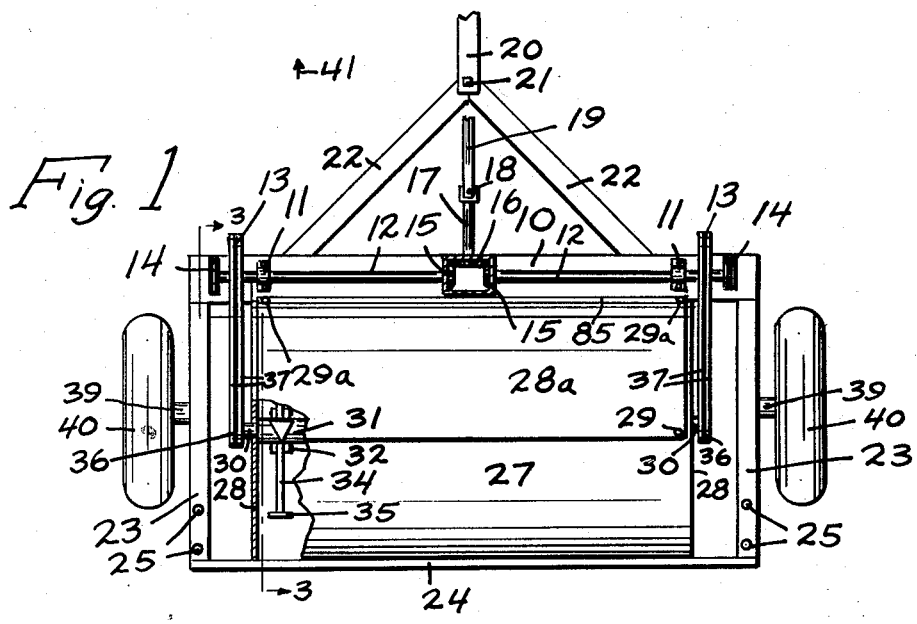
Figure 2:
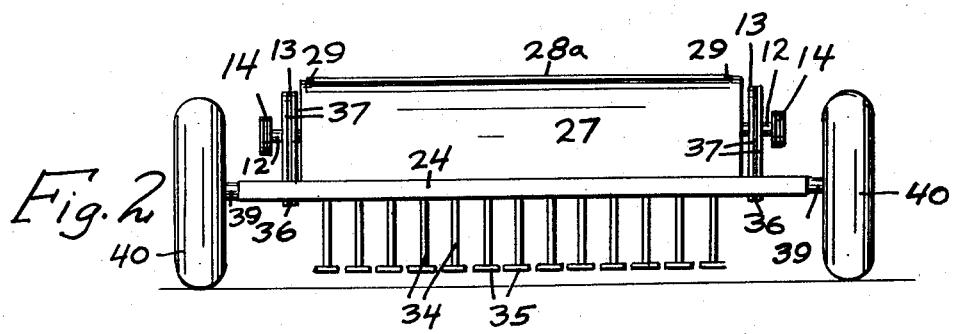
Figure 3:
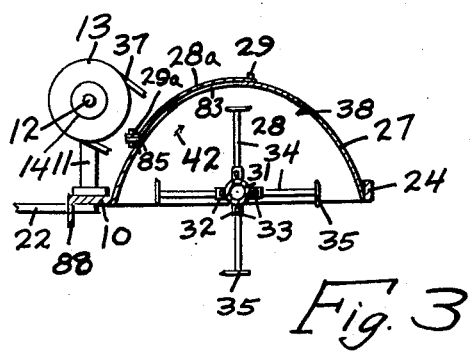
Figure 7:
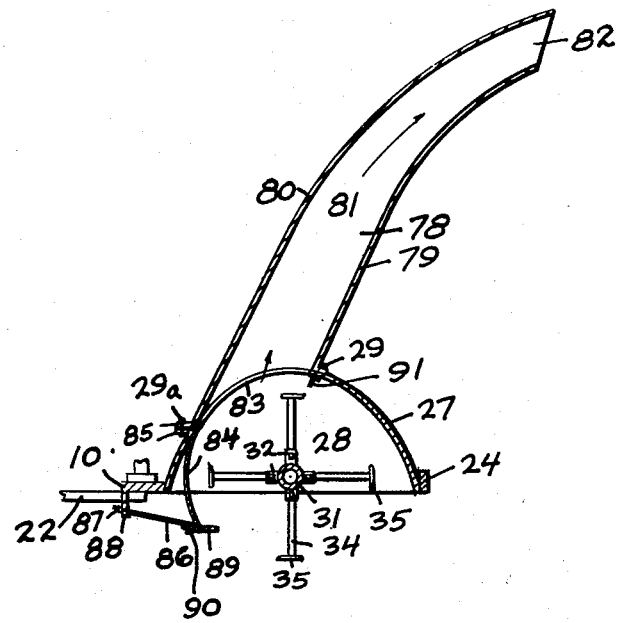
Figure 8:
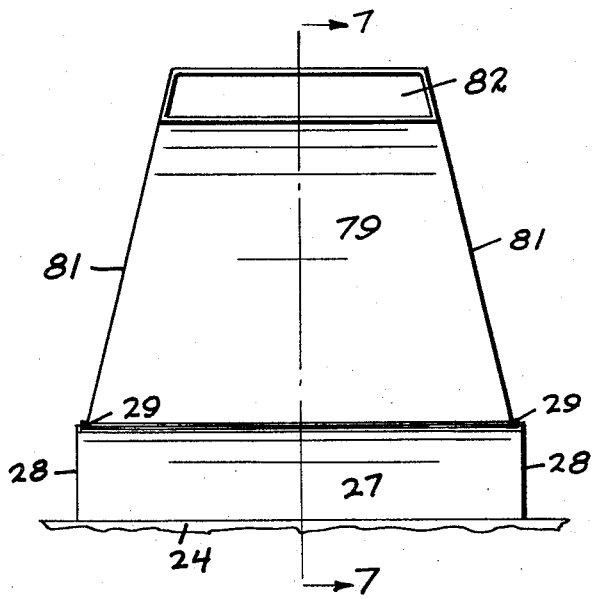

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a plan view of the chopper unit with parts being broken away and shown in section as it is used for shredding and pulverizing stalks, etc. in the field, Figure 2 is a rear view of Figure 1, Figure 3 is a sectional view of Figure 1 taken substantially along the lines 3—3 of Figure 1, Figure 4 is a plan view of a portion of the unit with parts being broken away and parts shown in section with the conveyor and blower unit attached thereto, Figure 5 is a sectional view of Figure 4 taken substantially along the lines 5—5 of Figure 4, Figure 6 is a section taken substantially along the lines 6—6 of Figure 4 with portions of the drive structure added, Figure 7 is a sectional view taken along the lines 7—7 of Figure 8, and showing one of the attached units, and Figure 8 is a rear view of Figure 7.

I have used the character 10 to designate a flat horizontal strap to which is secured the bearings 11 in which bearings are journalled the shafts 12, to which shafts 12 are attached the larger pulleys 13 and smaller pulleys 14, the shafts 12 being attached to bevel gears 15 which mesh with a further bevel gear 16 which is attached to a shaft 17 which is attached to a universal joint 18, which joint is attached to a power take-off shaft 19 which passes to the rear power take-off of a tractor, the tractor drawbar being indicated by the character 20 and being attached as at 21 to the further members 22 which are attached to the strap 10.

The strap 10 is secured to the forwardly positioned framework portions 23 which are further secured to a bracing bar 24 which is parallel to the strap 10. The framework portions 23 include the openings 25.

Attached between the members 10 and 24 is a downwardly facing semi-cylindrical casing 27 having the end walls 28, and attached to the casing wall 27 is an arcuate plate 28a which is removable and which is secured as at 29 and 29a to the member 27. Passing through the end walls 28 are the shafts 30 which are secured to a transverse pipe member 31, and attached to the member 31 are laterally spaced ears 32 to which are pivoted at 33 the radially positioned hammers 34 terminating in the triangular-shaped blades 35.

Attached to the shafts 30 are the pulleys 36 over which pass the belts 37, which belts also pass over the larger pulleys 13. Attached within the casing walls 27 is the transverse bar 38, which bar can be removed if desired. Secured to the frame portions 23 are the stub shafts 39 on which are journalled the supporting wheels 40.

As the tractor is driven forwardly in the direction of the arrow 41, the various drives will drive the shafts 30 and pipe 31 at a relatively high speed and in the direction of the arrow 42 (see Figure 3), which correspondingly will cause the members 34 and 35 to gather the material in the field, the hay thence being directed against the bars 38, thereby being chopped, the continuing rotation of the members 34 and 35 causing the hay to be carried around and re-deposited in the field in the modification shown in Figures 1 to 3 inclusive.

If it is desired to convey the chopped material externally into a wagon or other device, the modification shown in Figures 4 to 6 is attached to the unit, and in this modification an additional lateral casing 43 is used, in which casing is journalled a shaft 44 and attached to the shaft 44 are the helical conveyors 45 (see Figure 4), the conveyor 45 at the other side of the casing 43 being pitched oppositely, so that the material will be carried toward the center. The casing member 43 is supported by means of the angle members 46, these members being bolted through the openings 25 by means of the bolts 47 thereby supporting this unit, this unit also including a fan housing 48 in which is mounted the rotatable impeller blades 49 which are attached to the hub 50, which hub is attached to a shaft 51, and attached to the shaft 51 is the universal joint 52 which is attached to a further shaft 53 which is attached to a further universal joint 54 which is attached to a further shaft 55 which is attached to a small pulley 56 in the casing 57, the small pulley 56 being engaged by a belt 58 passing over a larger pulley 59 which is also enclosed in the casing 57, the casing 57 being suitably secured to the casing 60, which casing 60 encloses the bevel gears 15 and 16, the pulley 59 being driven by means of the shaft 17, this drive arrangement being used when the blower unit is employed.

The casing 43 communicates to the blower at the opening 61, and attached to the top of the blower casing 48 is a short cylindrical piece 62 which rotatably receives a female cylindrical section 63 which is secured to the spout member 64, the spout member 64 extending into the further portions 65 and having the side walls 66, the spout being open at 67. Attached to the member 63 is a lug 68 to which is secured at 69 a bar 70 which is secured at 71 to a V-shaped member 72, which V-shaped member is pivoted downwardly to receive the wagon tongue 73 which is adapted to draw the wagon in which the material is to be blown, the tongue 73 being pivotally secured at 74 to the extending lug 75 which is suitably secured to the casing 43, and by virtue of this arrangement it will be noted that when the tongue 73 swings laterally about the point 74, the solid attachment of the member 70 will correspondingly rotate the spout 64, so that regardless of the positioning of the wagon, or the turning of the unit, the wagon will be constantly aligned with the spout, so that the material will be always thrown directly into the same, since the rotation of the tongue 73 and rod 70 will rotate the member 63.

The shaft 44 is rotated by means of the belts 76 which engage the pulleys 14 and the additional pulleys 77, which are attached at the ends of the shaft 44, the belts 76 being removed when the other types are used.

Figures 7 and 8 illustrate a further converted arrangement, and in this type, the arcuate plate 28a is removed, and in place of the same there is bolted at the same points 29 and 29a the upwardly and rearwardly extending hollow member 78 having the arcuate walls 79 and 80, and side walls 81, and the upper opening 82 through which the chopped hay is thrown into the wagon or other receptacle. The removal of the plate 28a leaves an opening at 83 through which the rapidly revolving hammers and blades will eject the material upwardly and outwardly through the member 78. This latter structure can be used when it is desired to provide a lighter unit or for other purposes. In this structure also, I provide an arcuate sheet of thin metal 84 which is bolted to the flanges 85 at 29a, this member 84 following the circle of rotation of the hammer members 35 and provides means to increase the air pressure adjacently to it, the sheet 84 extending into a further portion 86 which includes adjustable attachments at 87, which are attached to the downwardly extending flange 88, which extends from the member 10, so that in this way the passageway adjacent to the members 35 can be varied. Also attached to the junction of the portions 86 and 84 is a lateral bar 89 which includes suitable slots (not shown) which receive the bolts 90, the slots permitting adjustable positioning of the bar 89 closer to the swinging hammers 35 if desired, or farther therefrom. In this construction I also attach a deflector bar 91 to the casing wall to assist in directing the material into the member 78.

It will thus be noted that I have provided a readily convertible hay chopper for the purposes intended and having the advantages mentioned in the objects of my invention.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A convertible hay chopper comprising a framework, a substantially semi-cylindrical casing attached to said framework, said casing having an upper opening, an upwardly extending discharging chute attached to said opening, a substantially arcuate downwardly extending plate member attached to and within said casing and at the lower end of said chute, a transversely positioned shaft mounted in said casing and including a plurality of radially positioned swinging hammers attached thereto, said downwardly extending plate member following generally the path of travel of the outer ends of said hammers, means for adjustably positioning said downwardly extending plate member, an adjustable laterally positioned bar attached to said downwardly extending plate member.

References Cited in the file of this patent

UNITED STATES PATENTS

| | | |
|---|---|---|
| 2,352,854 | Miller | July 4, 1944 |
| 2,506,054 | Agee et al. | May 2, 1950 |
| 2,608,310 | DePenning | Aug. 26, 1952 |
| 2,658,319 | Hansen | Nov. 10, 1953 |
| 2,663,985 | Hinson | Dec. 29, 1953 |
| 2,701,940 | Carr | Feb. 15, 1955 |
| 2,786,317 | Lundell | Mar. 26, 1957 |